(12) United States Patent
Kang et al.

(10) Patent No.: US 12,123,399 B2
(45) Date of Patent: Oct. 22, 2024

(54) LOAD CONTROL METHOD AND APPARATUS FOR WIND TURBINE GENERATOR SYSTEM

(71) Applicant: XINJIANG GOLDWIND SCIENCE & TECHNOLOGY CO., LTD., Xinjiang (CN)

(72) Inventors: Weixin Kang, Beijing (CN); Guilin Zhou, Beijing (CN); Pengfei Zhang, Beijing (CN); Xiaofang Huang, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 5 days.

(21) Appl. No.: 18/043,662

(22) PCT Filed: Jun. 10, 2021

(86) PCT No.: PCT/CN2021/099410
§ 371 (c)(1),
(2) Date: Mar. 1, 2023

(87) PCT Pub. No.: WO2022/048228
PCT Pub. Date: Mar. 10, 2022

(65) Prior Publication Data
US 2023/0265832 A1     Aug. 24, 2023

(30) Foreign Application Priority Data
Sep. 1, 2020     (CN) .......................... 202010903660.6

(51) Int. Cl.
*F03D 7/00*     (2006.01)
*F03D 7/04*     (2006.01)
(Continued)

(52) U.S. Cl.
CPC ........ *F03D 7/042* (2013.01); *F05B 2270/331* (2013.01); *H02P 9/008* (2013.01); *H02P 2101/15* (2015.01)

(58) Field of Classification Search
CPC ........ F03D 7/042; F03D 7/046; F03D 17/006; F03D 17/011; F03D 7/045; F03D 7/00;
(Continued)

(56) References Cited

U.S. PATENT DOCUMENTS

2017/0292501 A1* 10/2017 Perley .................... F03D 17/00

FOREIGN PATENT DOCUMENTS

| CN | 102493918 A | 6/2012 |
|---|---|---|
| CN | 105604807 A | 5/2016 |

(Continued)

OTHER PUBLICATIONS

The Extended European Search Report dated Dec. 15, 2023; Appln. No. 21863297.4.
(Continued)

*Primary Examiner* — Julio C. Gonzalez

(57) ABSTRACT

A load control method and a load control apparatus for a wind turbine generator system are provided, and the load control method includes: obtaining feature parameters of the wind turbine generator system for load prediction; obtaining a load estimation value of the wind turbine generator system by inputting the obtained feature parameters into a virtual load sensor; adjusting a control strategy of the wind turbine generator system based on the obtained load estimation value. A controller and a computer readable storage medium storing a computer program are further included. With the load control method and apparatus for the wind turbine generator system, a trained virtual load sensor can be used to realize real-time monitoring of the load of the on-site (Continued)

wind turbine generator system, and a reference for adjusting the control strategy can be provided according to the load.

7 Claims, 5 Drawing Sheets

(51) Int. Cl.
  *H02P 9/00* (2006.01)
  *H02P 101/15* (2016.01)

(58) Field of Classification Search
  CPC ...... F03D 17/00; H02P 9/008; H02P 2101/15; F05B 2270/331; F05B 2260/821; F05B 2260/84; F05B 2270/404; Y02E 10/72
  See application file for complete search history.

(56) References Cited

FOREIGN PATENT DOCUMENTS

| | | | |
|---|---|---|---|
| CN | 106351792 A | 1/2017 | |
| CN | 106640548 A | 5/2017 | |
| CN | 107654336 A | 2/2018 | |
| CN | 108757312 A | 11/2018 | |
| CN | 109962493 A | 7/2019 | |
| CN | 110210044 A | 9/2019 | |
| CN | 111997831 A | 11/2020 | |
| EP | 2 048 562 A1 | 4/2009 | |
| EP | 2 302 206 A1 | 3/2011 | |
| EP | 3 260 700 A1 | 12/2017 | |
| EP | 3473846 A1 * | 4/2019 | ............... F03D 1/02 |
| KR | 20120029676 A | 3/2012 | |
| WO | 2014/053136 A1 | 4/2014 | |
| WO | 2022/048228 A1 | 3/2022 | |

OTHER PUBLICATIONS

Australian Examination Report No. 1; Appln. No. 2021335744; dated Mar. 13, 2024.
Chilean First Office Action; dated Jan. 10, 2024; Appln. No. 202300586.
Chinese Patent Grant dated Oct. 22, 2021; Appln. No. 202010903660.6.
The First Chinese Office Action dated Apr. 21, 2021; Appln. No. 202010903660.6.
The Second Chinese Office Action dated Jul. 16, 2021; Appln. No. 202010903660.6.
The International Search Report mailed Aug. 27, 2021; PCT/CN2021/099410.

* cited by examiner

LOAD CONTROL METHOD AND APPARATUS FOR WIND TURBINE GENERATOR SYSTEM

This application is a National Stage of International Application No. PCT/CN2021/099410, filed on Jun. 10, 2021, which claims the priority to Chinese Patent Application No. 202010903660.6, filed on Sep. 1, 2020, both of which are hereby incorporated by reference in their entireties

TECHNICAL FIELD

The present disclosure generally relates to the field of wind power generation technologies, and more particularly to a load control method and a load control apparatus for a wind turbine generator system.

BACKGROUND

One main object of controlling the wind turbine generator system is to reduce a load of the wind turbine generator system and ensure that the wind turbine generator system operates safely. A load value of each key structural component of the wind turbine generator system is the most direct basis for determining whether to perform load reduction control.

In a simulation process, parameters of a controller are often adjusted according to load timing sequence to achieve load control of each component of the wind turbine generator system. In actual operation of the wind turbine generator system, a load sensor is often required to be installed to obtain real-time load information, but such a load sensor is very expensive to install, maintain and replace, and cannot be widely used at present. A relative conservative control strategy is usually adopted by a current wind turbine generator system without the load sensor to ensure that the wind turbine generator system operates safely. However, correspondingly, optimal power generation performance cannot be ensured for the wind turbine generator system.

That is, since a physical load sensor is expensive and installing and maintaining the physical load sensor is difficult, the load sensor cannot be installed for all wind turbine generator systems operating on-site, and thus real-time monitoring of the load cannot be achieved. However, the load value of each key structural component determines whether the load reduction control is required and the extent to which a control parameter is required to be adjusted. Therefore, in the absence of real-time load data, the conservative control strategy can only be adopted, and optimal power generation capacity cannot be achieved.

In addition, it is difficult to obtain accurate and real-time wind resource data for the on-site wind turbine generator system, because cabin anemometers and wind direction meters commonly installed on the wind turbine generator system may be disturbed by rotation of impellers, resulting in inaccurate measurement of wind speed and wind direction. Meanwhile, currently there is no measurement apparatus applicable to measure other wind resource parameters, such as wind shear, inflow angle, and the like. If on-site wind resource parameters are used to infer the load, the inference may be limited by detection accuracy and real-time characteristic of the wind resource parameters.

SUMMARY

A purpose of exemplary embodiments of the present disclosure is to provide a load control method and a load control apparatus for a wind turbine generator system to overcome at least one of the above deficiencies.

In one general aspect, a load control method for a wind turbine generator system is provided, and the load control method includes: obtaining feature parameters of the wind turbine generator system for load prediction; obtaining a load estimation value of the wind turbine generator system by inputting the obtained feature parameters into a virtual load sensor; adjusting a control strategy of the wind turbine generator system based on the obtained load estimation value.

In another general aspect, a load control apparatus for a wind turbine generator system is provided, and the load control apparatus includes: a feature parameter obtaining module for obtaining feature parameters used by a wind turbine generator system for load prediction; a load estimation module for obtaining a load estimation value of the wind turbine generator system by inputting the obtained feature parameters into a virtual load sensor; a control strategy adjusting module for adjusting a control strategy of the wind turbine generator system based on the obtained load estimation value.

In another general aspect, a controller is provided, and the controller includes: a processor; memory for storing a computer program which, when executed by the processor, implements the above load control method for the wind turbine generator system.

In another general aspect, a computer readable storage medium storing a computer program is provided, and the computer program, when executed by a processor, implements the above load control method for the wind turbine generator system.

The load control method and the load control apparatus for the wind turbine generator system according to the exemplary embodiments of the present disclosure can use a trained virtual load sensor to achieve real-time monitoring of the load of the on-site wind turbine generator system, and can provide an adjustment reference of the control strategy according to the load, so as to ensure the safety of the wind turbine generator system without reducing the power generation performance of the wind turbine generator system.

BRIEF DESCRIPTION OF THE DRAWINGS

The above and other purposes, features and advantages of exemplary embodiments of the present disclosure will become more apparent by the following detailed description taken in conjunction with the accompanying drawings showing, by way of example, the embodiments.

DETAILED DESCRIPTION

Various exemplary embodiments will now be described more fully with reference to the accompanying drawings, some of the exemplary embodiments are shown in the accompanying drawings.

Figure 1:
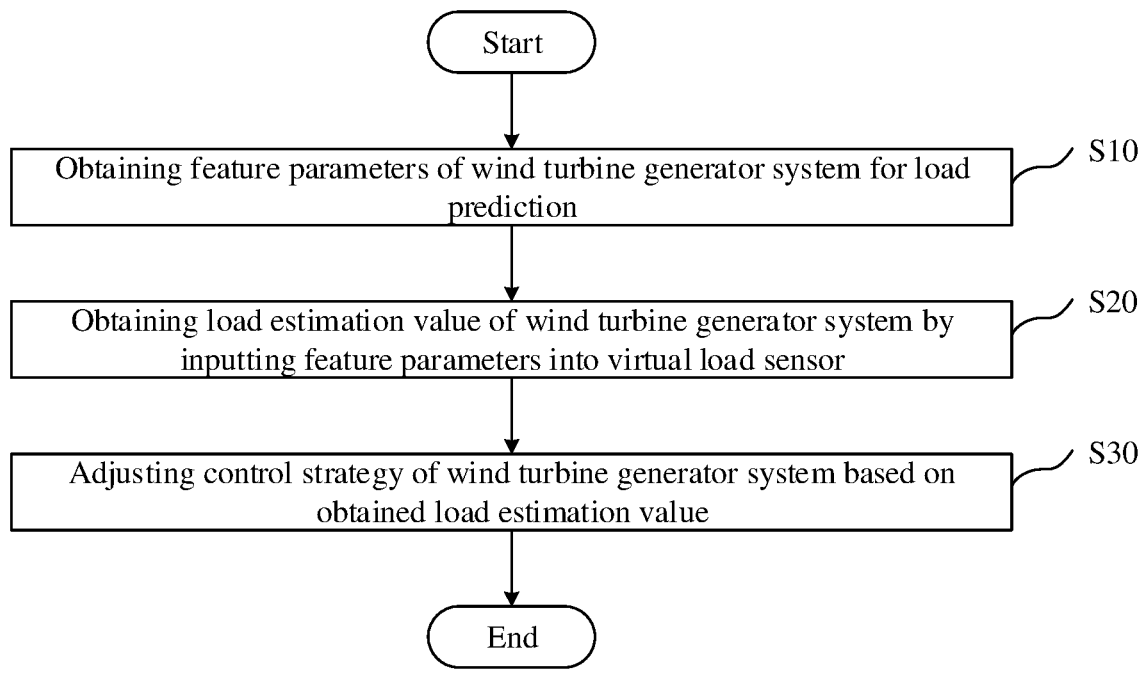
FIG. 1 shows a flow chart of a load control method for a wind turbine generator system according to an exemplary embodiment of the present disclosure.

FIG. 1 shows a flow chart of a load control method for a wind turbine generator system according to an exemplary embodiment of the present disclosure. The method may be performed by a central controller of the wind turbine generator system, or by a site-level controller of a wind farm, or by a computer device (such as a terminal and a server) or the like. The above computer device refers to a device having data calculating, processing and storing capabilities, and the computer device may be, for example, a PC (Personal Computer) or the server. The above computer device may refer to one or more computer devices. Optionally, the above server may be one server, or a server cluster composed of several servers, and may also be a cloud computing platform or a virtualization center. In the present application, an example is given for illustration in which the method is performed by the central controller of the wind turbine generator system, and the method may include the following steps:

With reference to FIG. 1, at step S10, feature parameters used by the wind turbine generator system for load prediction are obtained. For example, the central controller may receive the feature parameters sent by each sensor, and may also read prestored local feature parameters, which is not limited by the present disclosure.

In one example, the feature parameters for the load prediction may include: a configuration parameter of the wind turbine generator system, a control parameter corresponding to the control strategy used, an operation parameter of the wind turbine generator system, and a preset flag. As an example, the preset flag may include a preset event flag and/or a preset fault flag.

At step S20, a load estimation value of the wind turbine generator system is obtained by inputting the obtained feature parameters into a virtual load sensor. For example, the central controller obtains the feature parameters and then inputs the obtained feature parameters into the virtual load sensor, and an output of the virtual load sensor is the load estimation value of the wind turbine generator system.

In an exemplary embodiment of the present disclosure, a pre-trained virtual load sensor is used for obtaining, based on the feature parameters, the load estimation value of the wind turbine generator system to achieve real-time monitoring of the load of the wind turbine generator system.

A process for training the virtual load sensor will described below with reference to FIG. 2 to FIG. 4.

Figure 2:
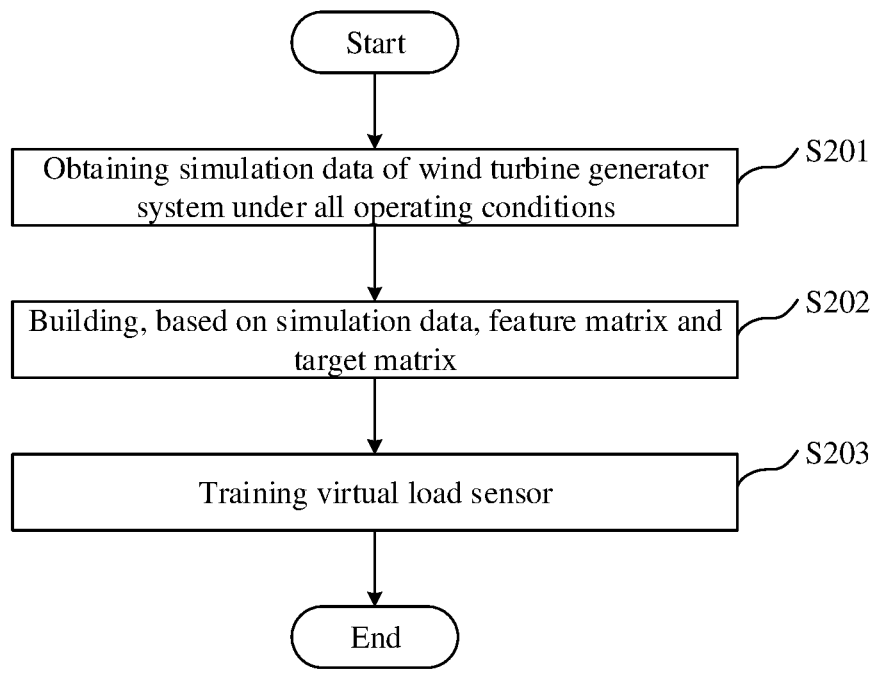
FIG. 2 shows a flow chart of the step of training a virtual load sensor according to an exemplary embodiment of the present disclosure.

FIG. 2 shows a flow chart of the step of training a virtual load sensor according to an exemplary embodiment of the present disclosure.

As shown in FIG. 2, at step S201, simulation data of the wind turbine generator system under all operating conditions are obtained.

For example, the simulation data of the wind turbine generator system under all operating conditions may be obtained from a simulation database.

Figure 3:
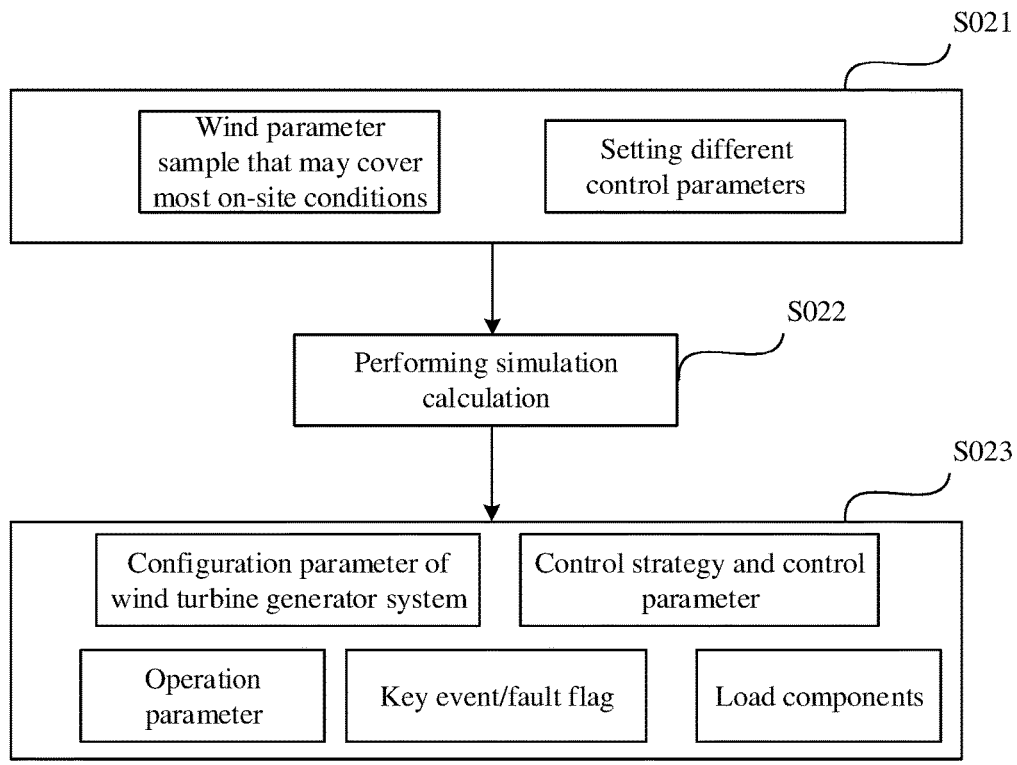
FIG. 3 shows a flow chart of the step of obtaining simulation data according to an exemplary embodiment of the present disclosure.

FIG. 3 shows a flow chart of the step of obtaining simulation data according to an exemplary embodiment of the present disclosure.

As shown in FIG. 3, at step S021, a simulation input is set. For example, a wind parameter sample and the control parameter may be set.

In one preferred example, in order to make the load prediction of the virtual load sensor more accurate, when the simulation data are calculated, a wind parameter sample that can envelop all possible on-site conditions is required to be set to cause as many load conditions as possible. Specifically, all wind parameter conditions in historical data may be analyzed and wind parameter boundaries may be designed to determine a maximum envelope and a minimum envelope of the wind parameter sample, and combination is made and sampling is performed within this range. Herein, the wind parameter sample may be obtained by using various sampling methods, for example, Monte Carlo sampling and the like, which is not described in detail herein.

In addition, considering that under the same wind resource condition, different control strategies and control parameters may affect the load, different control parameters may be set during simulation, so as to introduce control-related feature parameters into virtual load sensor training.

At step S022, the simulation is performed by a simulation software by use of the wind parameter sample and the control parameter to obtain a simulation database with good coverage, that is, the simulation data of the wind turbine generator system under all operating conditions are included in the simulation database.

For example, various kinds of current dynamics simulation software for the wind turbine generator system has high-fidelity models for key components of the wind turbine generator system, so various existing simulation software may be used to obtain the simulation data of the wind turbine generator system based on the wind parameter sample and the control parameter. As an example, the simulation software may include, but not limited to, Bladed, HAWC2, FAST, FLEX, and the like.

At step S023, the simulation data of the wind turbine generator system under all operating conditions are obtained from the simulation database, that is, a feature matrix and a target matrix are extracted from the simulation database.

For example, the simulation data in the simulation database may include, but not limited to: the configuration parameter of the wind turbine generator system, the control parameter corresponding to the control strategy used, the operation parameter of the wind turbine generator system, and the preset flag, and load components (for example, a load value at a current moment and a load value after a predetermined duration).

Herein, the operation parameter of the wind turbine generator system may include all operation data practically obtainable on-site from the wind turbine generator system.

As an example, the operation parameter of the wind turbine generator system may include but not limited to: generator speed, generator acceleration, torque, power, pitch angle, pitch rate, pitch acceleration, cabin acceleration (fore-aft and side-side) and other variables reflecting a current operation state of the wind turbine generator system.

Herein, different sensors may be installed on different on-site wind turbine generator systems, and thus the obtainable operation data of the wind turbine generator systems may be different. In order to make the trained virtual load sensor more widely applicable, as many operation data obtainable on-site from the wind turbine generator systems as possible should be introduced. For example, some wind turbine generator systems are configured with a laser radar and may obtain relatively accurate wind speed information, and thus, the wind speed information may be introduced into the virtual load sensor training, that is, the wind speed information may be introduced into the operation parameter obtained by the simulation software.

Considering that most wind turbine generator systems are not equipped with the load sensor and are limited by wind resource conditions and the like, extreme loads under many special conditions may not be excited in a short duration. For example, extreme gusts may not occur on-site in a short duration, and thus it may be difficult to obtain load conditions caused by the gusts. Based on the above simulation method, simulation data of high-fidelity and full-coverage can be obtained, so that the data for training the virtual load sensor can be extracted from the simulation data. Herein, the simulation data for training may be collected on-site, so that the virtual load sensor trained according to the simulation data can be applied to the on-site wind turbine generator system.

In an exemplary embodiment of the present disclosure, effects of different control strategies and control parameters are considered when the simulation database is calculated, so that the simulation database has relatively good coverage, and it may be possible to introduce control dimension information when the virtual load sensor is trained.

With reference back to FIG. 2, at step S202, the feature matrix and the target matrix are built based on the simulation data.

Herein, the feature matrix is composed of the feature parameters for the load prediction extracted from the simulation data, and the target matrix is composed of the real-time load value at the current moment and the load value after the predetermined duration extracted from the simulation data.

For example, the feature matrix and the target matrix are built by using the configuration parameter, the operation parameter at each time step, the preset flag, the control parameter, the load value at the current moment and the load value after the predetermined duration that are extracted from the simulation data.

At step S203, the virtual load sensor is trained by using the feature matrix as an input of the virtual sensor and the target matrix as an output of the virtual load sensor.

Figure 4:
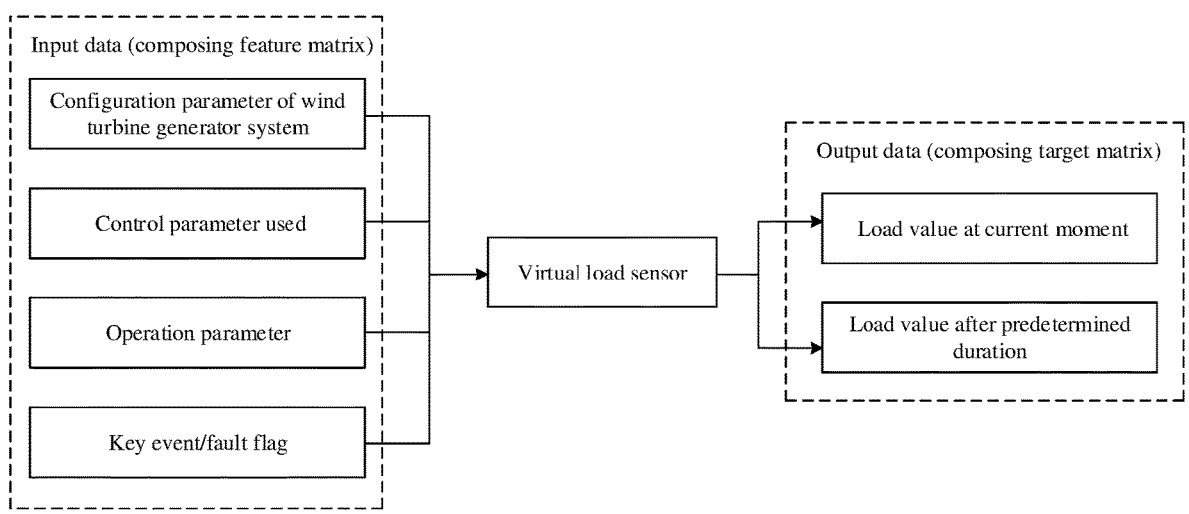
FIG. 4 shows a schematic view of training a virtual load sensor according to an exemplary embodiment of the present disclosure.

FIG. 4 shows a schematic view of training a virtual load sensor according to an exemplary embodiment of the present disclosure.

As shown in FIG. 4, the feature matrix is the input of the virtual load sensor, and may include: the operation parameter of the wind turbine generator system, the control parameter, the configuration parameter and the preset flag. The target matrix is the output of the virtual load sensor and may include: the load value at the current moment and the load value after the predetermined duration.

Herein, the feature matrix and the target matrix are built by extracting, according to a determined time step, the above variables from timing simulation data, respectively. One group of data extracted at each determined time step is one training sample, that is, one group of data extracted at each determined time step composes one row of the feature matrix and the target matrix. As an example, the determined time step may be consistent with an operation time step of an on-site controller, or may be set as a predetermined multiple of the operation time step.

In one example, the configuration parameter of the wind turbine generator system included in the feature matrix may include but not limited to: rated speed, rated power, a minimum pitch angle, etc.

As an example, the configuration parameter may be converted into a difference and added into the feature matrix, for example, the rated speed may refer to a deviation of a current rated speed from the rated speed.

A control parameter of a load reduction strategy included in the feature matrix may refer to the control parameter used in this simulation, mainly including a common parameter of the load reduction strategy.

In one example, certain parameters may be changed when the control parameter is introduced into the feature matrix. For example, for a case where the control strategy is to increase a pitch angle value, for example, the pitch angle is changed from an optimal pitch angle $\theta_1$ to $\theta_2$, $\theta_2 > \theta_1$, and in this case, a range of a pitch angle change is of interest, and thus $(\theta_2 - \theta_1)$ may be introduced as the control parameter into the feature matrix.

The operation parameter included in the feature matrix is operation data that may be obtained on-site and may be extracted according to the determined time step. The pitch rate obtained at each moment may be differentiated to obtain the feature parameters that cannot be obtained on-site directly, such as the pitch acceleration and the like.

The preset flag included in the feature matrix may include, but not limited to, an over-speed flag, a normal shutdown flag, and the like. For example, each flag may be converted into a 0/1 flag which is 0 at each determined time step before being triggered and 1 at each determined time step after being triggered, and the flag may be added into the feature matrix to enable the virtual load sensor to contain relatively complete operation data of the wind turbine generator system, which is beneficial for improving accuracy of the virtual load sensor.

In the feature matrix used for virtual load sensor training, real-time operation state data and a fault/event flag of the wind turbine generator system are considered, thereby avoiding the use of the wind resource data that cannot be accurately measured on-site in real-time.

Load components included in the target matrix may include but not limited to: a blade root load (Mxy), a fixed hub load (My), a tower top load (Mxy), a tower bottom load (Mxy) and other load components required to be monitored. As an example, a length of the predetermined duration may be selected in conjunction with accuracy of a load prediction value and an adjustment duration required to control the load reduction.

The target matrix used for virtual load sensor training includes a load value for a period of time in the future, which makes it possible to predict the load value, so that the load reduction and early warning for possible dangerous loads can be carried out in advance.

In one example, the virtual load sensor may be trained and built by using a well-established neural network algorithm in the field of deep learning, such as a cyclic neural network, a convolutional neural network, and the like, and a using method and a training process of the algorithm will not described in detail in this disclosure. It is understood that, the present disclosure is not limited to this, and other machine learning and deep learning algorithms may be used to build the virtual load sensor.

In one preferred example, after passing an evaluation on a simulation data set, the virtual load sensor is further required to be tested on a data set measured on-site and be corrected to eliminate a possible deviation between a simulation model system and a real wind turbine system.

For example, a wind turbine generator system provided with a physical load sensor in the wind farm may be selected, and a real load measurement value of the wind turbine generator system collected by the physical load sensor may be used to correct the virtual load sensor.

With reference back to FIG. 1, at step S30, the control strategy of the wind turbine generator system is adjusted based on the obtained load estimation value.

As an example, the load estimation value of the wind turbine generator system may include a real-time load estimation value at a current moment and a load prediction value after a predetermined duration. In this case, the wind turbine generator system may be controlled to perform a shutdown control strategy or a load reduction control strategy based on the real-time load estimation value and the load prediction value of the wind turbine generator system.

Figure 5:
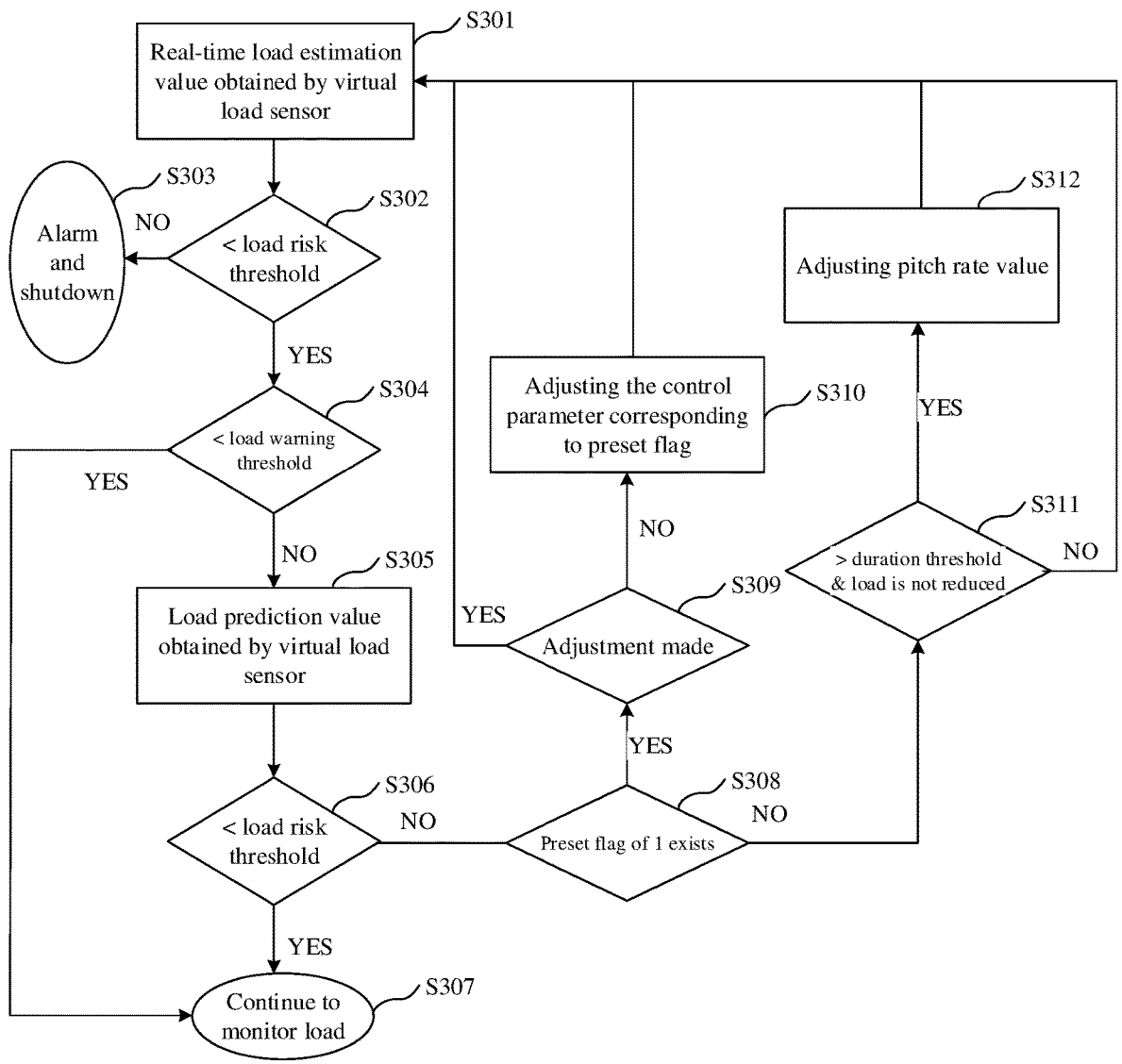
FIG. 5 shows a flow chart of the step of adjusting a control strategy of a wind turbine generator system based on a load estimation value according to an exemplary embodiment of the present disclosure.

FIG. 5 shows a flow chart of the step of adjusting a control strategy of a wind turbine generator system based on a load estimation value according to an exemplary embodiment of the present disclosure.

As shown in FIG. 5, at step S301, the real-time load estimation value output by the virtual load sensor is obtained.

At step S302, the real-time load estimation value is compared to a load risk threshold, that is, it is determined whether the real-time load estimation value is less than the load risk threshold.

Herein, the load risk threshold may be set according to the accuracy of the virtual load sensor or an on-site requirement.

Under a condition that the real-time load estimation value is not less than (that is, greater than or equal to) the load risk threshold, step S303 is performed: controlling the wind turbine generator system to perform the shutdown control strategy, and meanwhile, an alarm signal may be sent out.

Under a condition that the real-time load estimation value is less than the load risk threshold, step S304 is performed: comparing the real-time load estimation value to a load warning threshold, that is, determining whether the real-time load estimation value is less than the load warning threshold.

Herein, the load warning threshold is less than the load risk threshold. For example, the load warning threshold may be set according to the accuracy of the virtual load sensor or the on-site requirement.

Under a condition that it is determined that the real-time load estimation value is less than the load warning threshold, it is considered that there is no abnormality, and in this case, step S307 is performed: continuing load monitoring. For example, the feature parameters used by the wind turbine generator system for load prediction are obtained continuously, and the load estimation value is obtained based on the virtual load sensor so as to adjust the control strategy.

Under a condition that it is determined that the real-time load estimation value is not less than the load warning threshold, step S305 is performed: obtaining the load prediction value output by the virtual load sensor.

At step S306, the load prediction value is compared to the load risk threshold, that is, it is determined whether the load prediction value is less than the load risk threshold.

Under a condition that the load prediction value is less than the load risk threshold, step S307 is performed.

That is, in this case, it shows that the real-time load estimation value at the current moment is greater than or equal to the load warning threshold but a load prediction value for a period of time in the future is less than the load risk threshold, and thus it is considered that a fluctuation of the load may exist or an existing control strategy is working, so no action is taken temporarily, and a load change monitoring is continued.

Under a condition that the load prediction value is not less than the load risk threshold, the wind turbine generator system is controlled to perform the load reduction control strategy.

That is, under a condition that the load prediction value for the period of time in the future is greater than or equal to the load risk threshold, it is considered that the load is too large and the wind turbine generator system has a potential risk, and thus a load reduction attempt is required, that is, a rapid reference is provided for adjusting the control strategy based on an output result of the virtual load sensor.

For example, at step S308, it is determined whether a preset flag indicating a valid state exists.

As an example, the preset flag may include a plurality of flags, a value of each flag includes a first value and a second value, the first value (for example, a value of 1) represents that the flag indicates the valid state, that is, an event indicated by the flag occurs, and the second value (for example, a value of 0) represents that the flag indicates an invalid state, that is, an event indicated by the flag does not occur.

For example, at step S308, whether the preset flag indicating the valid state exists may be determined by detecting whether the preset flag set to be 1 exists.

Under a condition that the preset flag indicating the valid state exists, step S309 is performed: determining whether the adjustment has been made, that is, determining whether a load reduction process has been performed based on the control strategy corresponding to the preset flag.

Under a condition that the adjustment has been made, that is, the load reduction process has been performed based on the control strategy corresponding to the preset flag, the adjusting flow returns to step S301 to continue to determine, based on the virtual load sensor, the load estimation value of the wind turbine generator system to achieve real-time monitoring of the load.

Under a condition that the adjustment has not been made, that is, the load reduction process has not been performed based on the control strategy corresponding to the preset flag, step S310 is performed: determining, based on a corresponding control strategy when an event indicated by the preset flag occurs, an adjustable control parameter.

For example, a control parameter under the corresponding control strategy when the event indicated by the preset flag occurs may be determined as the adjustable control parameter, the adjustable control parameter may be determined based on a target load value after load reduction (a target load value expected by the load reduction control strategy), and the determined adjustable control parameter may be used to replace a corresponding control parameter of the feature parameters for the load prediction, so that a load estimation value may be re-determined by inputting the updated feature parameters to the virtual load sensor.

Optionally, an optimal value of the adjustable control parameter may be determined based on the target load value after load reduction, and a load reduction purpose may be achieved by performing a load reduction operation. However, the present disclosure is not limited to this, and the adjustable control parameter may be gradually adjusted by repeating the operation to achieve a load reduction effect.

Under a condition that the preset flag indicating the valid state does not exist, step S311 is performed: determining whether a duration in which the load prediction value is not less than the load risk threshold is greater than a duration threshold, and determining whether the load is reduced in the duration.

Under a condition that the duration in which the load prediction value is not less than the load risk threshold is not greater than the duration threshold, and/or it is determined that the load is reduced in the duration, the adjusting flow returns to step S301 to continue to determine, based on the virtual load sensor, the load estimation value of the wind turbine generator system to achieve real-time monitoring of the load.

Under a condition that the duration in which the load prediction value is not less than the load risk threshold is greater than the duration threshold, and it is determined that the load is not reduced in the duration, step S312 is performed: determining a predefined control parameter as the adjustable control parameter.

In one example, the predefined control parameter may refer to a pitch rate value, that is, the pitch rate value is determined as the adjustable control parameter, and the pitch rate value is determined based on the target load value after load reduction, and the determined pitch rate value is used to replace a corresponding parameter of the feature parameters for load prediction (that is, a previous pitch rate value is replaced), so that the load estimation value may be re-determined by inputting the updated feature parameters to the virtual load sensor.

Optionally, an optimal value of the pitch rate value may be determined based on the target load value after load reduction, and a load reduction purpose may be achieved by performing a load reduction operation. However, the present disclosure is not limited to this, and the pitch rate value may be gradually adjusted by repeating the operation to achieve the load reduction effect.

Because the above feature matrix for training the virtual load sensor includes the control parameter, an optimal control parameter satisfying a load requirement can be found rapidly according to different control parameters in the above steps, thus providing a basis for the load reduction.

Figure 6:
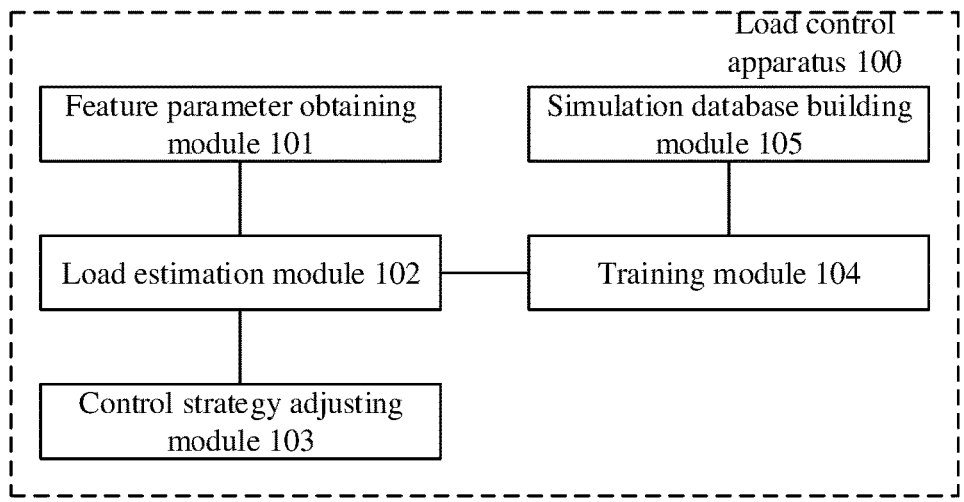
FIG. 6 shows a block diagram of a load control apparatus for a wind turbine generator system according to an exemplary embodiment of the present disclosure.

FIG. 6 shows a block diagram of a load control apparatus for a wind turbine generator system according to an exemplary embodiment of the present disclosure.

As shown in FIG. 6, a load control apparatus 100 for the wind turbine generator system according to an exemplary embodiment of the present disclosure includes: a feature parameter obtaining module 101, a load estimation module 102, and a control strategy adjusting module 103.

Specifically, the feature parameter obtaining module 101 is configured to obtain the feature parameters used by the wind turbine generator system for load prediction.

In one example, the feature parameters for the load prediction may include: the configuration parameter of the wind turbine generator system, the control parameter corresponding to the control strategy used, the operation parameter of the wind turbine generator system, and the preset flag. As an example, the preset flag may include the preset event flag and/or the preset fault flag.

The load estimation module 102 is configured to obtain the load estimation value of the wind turbine generator system by inputting the obtained feature parameters into the virtual load sensor;

In an exemplary embodiment of the present disclosure, the load estimation module 102 is configured to use a pre-trained virtual load sensor to obtain, based on the feature parameters, the load estimation value of the wind turbine generator system to achieve real-time monitoring of the load of the wind turbine generator system.

In one example, the load control apparatus 100 for the wind turbine generator system according to an exemplary embodiment of the present disclosure further includes: a training module 104 and a simulation database building module 105.

Figure 7:
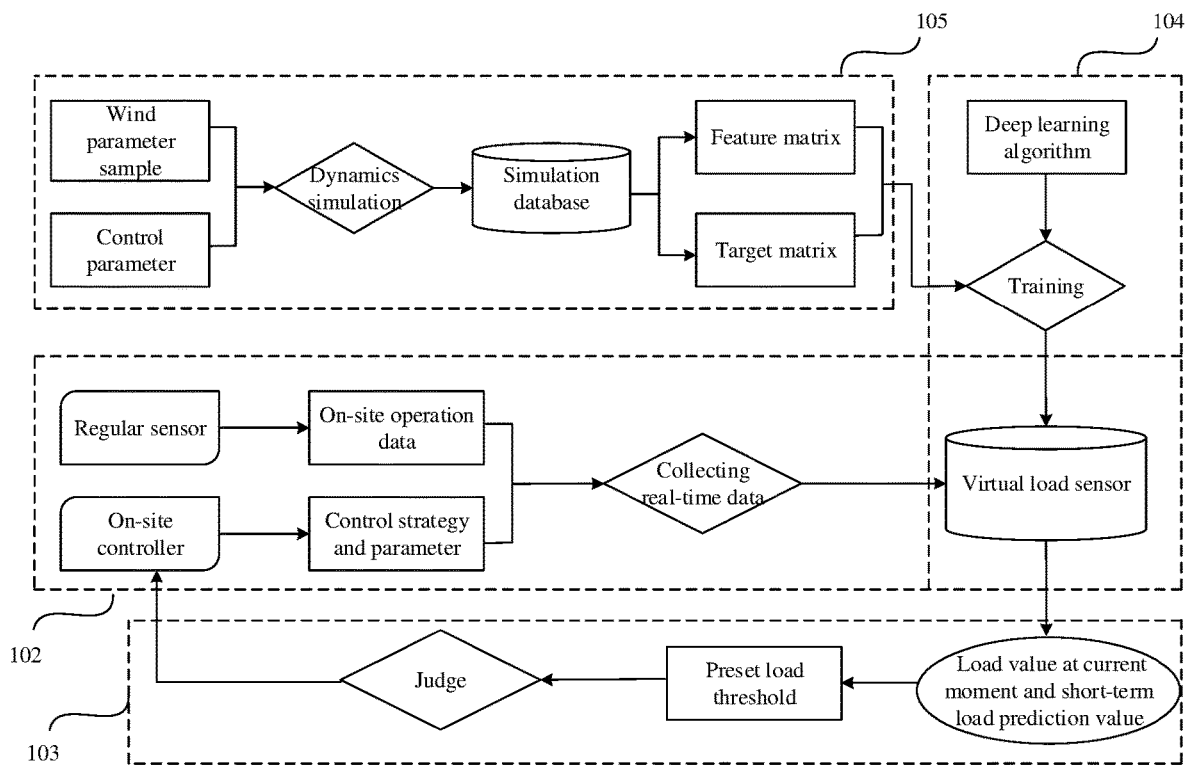
FIG. 7 shows a schematic view of a load control apparatus for a wind turbine generator system according to an exemplary embodiment of the present disclosure.

As shown in FIG. 7, the simulation database building module 105 may build simulation calculations according to the wind parameter sample and different control strategies to obtain a simulation database with high-fidelity and good coverage, and the training module 104 extracts the configuration parameter of the wind turbine generator system, the control parameter, the operation parameter of the wind turbine generator system, the preset flag, and the load components from the simulation database for the virtual load sensor training.

The training module 104 uses the feature matrix and target matrix built based on the simulation data, and uses a deep learning algorithm or a machine learning algorithm (for example, the neural network) to train the virtual load sensor, and may use on-site data of the physical load sensor to correct the virtual load sensor.

The load estimation module 102 uses the virtual load sensor to monitor the load when the wind turbine generator system actually operates, and may obtain the real-time load estimation value at the current moment and the load prediction value after the predetermined duration.

The control strategy adjusting module 103 is configured to adjust the control strategy of the wind turbine generator system based on the obtained load estimation value.

For example, the control strategy adjusting module 103 may determine, based on the real-time load estimation value and the load prediction value of the wind turbine generator system, and according to the preset load warning threshold and load risk threshold, whether load reduction control or shutdown is required.

When the control strategy adjusting module 103 determines that the load reduction control is required, a current control parameter may be adjusted according to recommendations for control parameter adjustment provided by the control strategy adjusting module 103, so as to control the wind turbine generator system.

For example, the control strategy adjusting module 103 may compare the real-time load estimation value to the load risk threshold. Under a condition that the real-time load estimation value is not less than the load risk threshold, the wind turbine generator system is controlled to perform the shutdown control strategy, and the alarm signal is sent out. Under a condition that the real-time load estimation value is less than the load risk threshold, the real-time load estimation value is compared to the load warning threshold. Herein, the load warning threshold is less than the load risk threshold.

Under a condition that it is determined that the real-time load estimation value is less than the load warning threshold, the load monitoring is continued. Under a condition that it is determined that the real-time load estimation value is not less than the load warning threshold, the load prediction value is compared to the load risk threshold.

Under a condition that the load prediction value is less than the load risk threshold, the load monitoring is continued. Under a condition that the load prediction value is not less than the load risk threshold, the wind turbine generator system is controlled to perform the load reduction control strategy.

For example, it is determined whether the preset flag indicating the valid state exists, and under a condition that the preset flag indicating the valid state exists, it is determined whether the adjustment has been made. Under a condition that the adjustment has been made, the load estimation value of the wind turbine generator system is determined continuously based on the virtual load sensor to achieve the real-time monitoring of the load.

Under a condition that the adjustment has not been made, the adjustable control parameter is determined based on the corresponding control strategy when the event indicated by the preset flag occurs. For example, the control parameter under the corresponding control strategy when the event indicated by the preset flag occurs may be determined as the adjustable control parameter, the adjustable control parameter may be determined based on the target load value after reduction (the target load value expected by the load reduction control strategy), and the determined adjustable control parameter may be used to replace the corresponding control parameter of the feature parameters for the load prediction, so that the load estimation value may be re-determined by inputting the updated feature parameters to the virtual load sensor.

Under a condition that the preset flag indicating the valid state does not exist, it is determined whether the duration in which the load prediction value is not less than the load risk threshold is greater than the duration threshold, and it is determined whether the load is reduced in the duration.

Under a condition that the duration in which the load prediction value is not less than the load risk threshold is not greater than the duration threshold, and/or it is determined that the load is reduced in the duration, the real-time monitoring of the load is continued.

Under a condition that the duration in which the load prediction value is not less than the load risk threshold is greater than the duration threshold, and it is determined that the load is not reduced in the duration, a predefined control parameter is determined as the adjustable control parameter.

In one example, the predefined control parameter may refer to the pitch rate value, that is, the pitch rate value is determined as the adjustable control parameter, the pitch rate value is determined based on the target load value after load reduction, and the determined pitch rate value is used to replace the corresponding parameter of the feature parameters for the load prediction, so that the load estimation value may be re-determined by inputting the updated feature parameters to the virtual load sensor.

Figure 8:
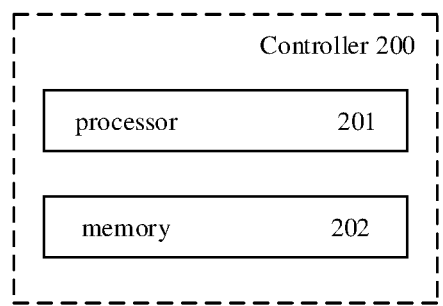
FIG. 8 shows a block diagram of a controller according to an exemplary embodiment of the present disclosure.

FIG. 8 shows a block diagram of a controller according to an exemplary embodiment of the present disclosure.

As shown in FIG. 8, a controller 200 according to an exemplary embodiment of the present disclosure includes: a processor 201 and memory 202.

Specifically, the memory 202 is used for storing a computer program which, when executed by the processor 201, implements the above load control method for the wind turbine generator system.

Herein, the load control method for the wind turbine generator system shown in FIG. 1 may be implemented in the processor 201 shown in FIG. 8. That is, the modules shown in FIG. 6 may be implemented by a general-purpose hardware processor such as a digital signal processor, a field programmable gate array, and the like, and may be implemented by a dedicated hardware processor such as a dedicated chip, and the like, and may be implemented in the form of software entirely by the computer program, for example, may be implemented as modules in the processor 201 shown in FIG. 8.

According to an exemplary embodiment of the present disclosure, a computer readable storage medium storing a computer program is provided. The computer readable storage medium stores a computer program which, when executed by a processor, causes the processor to implement the above load control method for the wind turbine generator system. The computer readable storage medium is any data storage apparatus that may store data read by a computer system. Examples of the computer readable storage medium include: read-only memory, random-access memory, an optical read-only disk, a magnetic tape, a floppy disk, an optical data storage apparatus, and a carrier wave (such as data transmission through the Internet via wired or wireless transmission paths).

The load control method and the load control apparatus for the wind turbine generator system according to the exemplary embodiments of the present disclosure can replace the physical load sensor to monitor real-time load data of the key structural components of the wind turbine generator system operating on-site, and can provide short-term load prediction in advance, and thus pre judge a trend of load development, control the wind turbine generator system according to the pre judged result, and maximize power generation capacity under the premise of ensuring safety of the wind turbine generator system.

In addition, the load control method and the load control apparatus for the wind turbine generator system according to the exemplary embodiments of the present disclosure are close to real on-site conditions, can achieve the real-time monitoring and the short-term prediction of the on-site load, and can provide reference for adjusting the control parameter.

In addition, the virtual load sensor according to the exemplary embodiment of the present disclosure does not need to distinguish the operating conditions of the wind turbine generator system, and all the information to be considered (for example, a current operating state of the wind turbine generator system, fault/event information, and the like.) has been included in the feature matrix used when the model is trained, that is, the information has been internalized in the virtual load sensor, which is more complete in logic. At the same time, the effects of the control parameters on the load are also considered in the feature matrix, so that the virtual load sensor can obtain a relatively accurate load value when various control parameters are used in the wind turbine generator system. The recommendations for the control parameter adjustment may also be provided when the load exceeds the load warning threshold to achieve a rapid and accurate load reduction.

While the present disclosure has been particularly shown and described with reference to its the exemplary embodiments, those of ordinary skill in the art will understand that various changes in the form and details may be made without departing from the gist and scope of the present disclosure as defined by the claims.

What is claimed is:

1. A load control method for a wind turbine generator system, wherein the load control method comprises:
   obtaining feature parameters of the wind turbine generator system for load prediction;
   obtaining a load estimation value of the wind turbine generator system by inputting the obtained feature parameters into a virtual load sensor;
   adjusting a control strategy of the wind turbine generator system based on the obtained load estimation value,
   wherein the feature parameters for the load prediction comprise: a configuration parameter of the wind turbine generator system, a control parameter corresponding to the control strategy used, an operation parameter of the wind turbine generator system, and a preset flag; and the preset flag comprises a preset event flag and/or a preset fault flag, wherein the load estimation value of the wind turbine generator system comprises a real-time load estimation value at a current moment and a load prediction value after a predetermined duration, the step of adjusting the control strategy of the wind turbine generator system based on the obtained load estimation value comprises:

controlling the wind turbine generator system to perform a shutdown control strategy or a load reduction control strategy based on the real-time load estimation value and the load prediction value of the wind turbine generator system, wherein the step of controlling the wind turbine generator system to perform the shutdown control strategy or the load reduction control strategy based on the real-time load estimation value and the load prediction value of the wind turbine generator system comprises:

comparing the real-time load estimation value to a load risk threshold;

controlling the wind turbine generator system to perform the shutdown control strategy and sending an alarm signal under a condition that the real-time load estimation value is not less than the load risk threshold;

comparing the real-time load estimation value to a load warning threshold under a condition that the real-time load estimation value is less than the load risk threshold, wherein the load warning threshold is less than the load risk threshold;

comparing the load prediction value to the load risk threshold under a condition that it is determined that the real-time load estimation value is not less than the load warning threshold;

controlling the wind turbine generator system to perform the load reduction control strategy under a condition that the load prediction value is not less than the load risk threshold.

2. The load control method according to claim 1, wherein the step of controlling the wind turbine generator system to perform the load reduction control strategy comprises:

determining whether the preset flag includes a flag having a value that indicates an event indicated by the flag occurs;

determining, based on a corresponding control strategy when the event indicated by the flag occurs, an adjustable control parameter under a condition that the preset flag includes the flag having the value that indicates the event indicated by the flag occurs;

determining a predefined control parameter as the adjustable control parameter under a condition that the preset flag does not include the flag having the value that indicates the event indicated by the flag occurs;

re-determining a load estimation value by using the determined adjustable control parameter to replace a corresponding control parameter of the feature parameters for the load prediction.

3. The load control method according to claim 1, wherein the virtual load sensor is trained by:

obtaining simulation data of the wind turbine generator system under predetermined operating conditions;

building, based on the simulation data, a feature matrix and a target matrix, wherein the feature matrix is composed of the feature parameters for the load prediction extracted from the simulation data, and the target matrix is composed of a real-time load value at a current moment and a load value after a predetermined duration extracted from the simulation data;

training the virtual load sensor by using the feature matrix as an input of the virtual load sensor and the target matrix as an output of the virtual load sensor.

4. The load control method according to claim 3, further comprising:

correcting the virtual load sensor using a real load measurement value of the wind turbine generator system collected by a physical load sensor.

5. A load control apparatus for a wind turbine generator system, wherein the load control apparatus comprises:

a feature parameter obtaining module configured to obtain feature parameters used by a wind turbine generator system for load prediction;

a load estimation module configured to obtain a load estimation value of the wind turbine generator system by inputting the obtained feature parameters into a virtual load sensor;

a control strategy adjusting module configured to adjust a control strategy of the wind turbine generator system based on the obtained load estimation value, wherein the feature parameters for the load prediction comprise: a configuration parameter of the wind turbine generator system, a control parameter corresponding to the control strategy used, an operation parameter of the wind turbine generator system, and a preset flag; and the preset flag comprises a preset event flag and/or a preset fault flag, wherein the load estimation value of the wind turbine generator system comprises a real-time load estimation value at a current moment and a load prediction value after a predetermined duration, the control strategy adjusting module is further configured for:

controlling the wind turbine generator system to perform a shutdown control strategy or a load reduction control strategy based on the real-time load estimation value and the load prediction value of the wind turbine generator system, wherein controlling the wind turbine generator system to perform the shutdown control strategy or the load reduction control strategy based on the real-time load estimation value and the load prediction value of the wind turbine generator system comprises:

comparing the real-time load estimation value to a load risk threshold;

controlling the wind turbine generator system to perform the shutdown control strategy and sending an alarm signal under a condition that the real-time load estimation value is not less than the load risk threshold;

comparing the real-time load estimation value to a load warning threshold under a condition that the real-time load estimation value is less than the load risk threshold, wherein the load warning threshold is less than the load risk threshold;

comparing the load prediction value to the load risk threshold under a condition that it is determined that the real-time load estimation value is not less than the load warning threshold;

controlling the wind turbine generator system to perform the load reduction control strategy under a condition that the load prediction value is not less than the load risk threshold.

6. A controller comprising:

a processor;

memory for storing a computer program which, when executed by the processor, causes the processor to perform operations including:

obtaining feature parameters of the wind turbine generator system for load prediction;

obtaining a load estimation value of the wind turbine generator system by inputting the obtained feature parameters into a virtual load sensor;

adjusting a control strategy of the wind turbine generator system based on the obtained load estimation value, wherein the feature parameters for the load prediction comprise: a configuration parameter of the wind turbine generator system, a control parameter corresponding to the control strategy used, an operation parameter of the wind turbine generator system, and a preset flag; and the preset flag comprises a preset event flag and/or a preset fault flag, wherein the load estimation value of the wind turbine generator system comprises a real-time load estimation value at a current moment and a load prediction value after a predetermined duration, the adjusting the control strategy of the wind turbine generator system based on the obtained load estimation value comprises:

controlling the wind turbine generator system to perform a shutdown control strategy or a load reduction control strategy based on the real-time load estimation value and the load prediction value of the wind turbine generator system, the controlling the wind turbine generator system to perform the shutdown control strategy or the load reduction control strategy based on the real-time load estimation value and the load prediction value of the wind turbine generator system comprises:

comparing the real-time load estimation value to a load risk threshold;

controlling the wind turbine generator system to perform the shutdown control strategy and sending an alarm signal under a condition that the real-time load estimation value is not less than the load risk threshold;

comparing the real-time load estimation value to a load warning threshold under a condition that the real-time load estimation value is less than the load risk threshold, wherein the load warning threshold is less than the load risk threshold;

comparing the load prediction value to the load risk threshold under a condition that it is determined that the real-time load estimation value is not less than the load warning threshold;

controlling the wind turbine generator system to perform the load reduction control strategy under a condition that the load prediction value is not less than the load risk threshold.

7. A non-transitory computer readable storage medium storing a computer program which, when executed by a processor, implements the load control method for the wind turbine generator system according to claim 1.

* * * * *